United States Patent [19]

Hirono et al.

[11] 3,906,900

[45] Sept. 23, 1975

[54] METHOD OF HANDLING SHRIMP EGGS

[75] Inventors: Yosuke Hirono, Crystal River; Donald E. Sweat, Key West, both of Fla.

[73] Assignee: Ralston Purina Company, St. Louis, Mo.

[22] Filed: Sept. 5, 1972

[21] Appl. No.: 286,051

[52] U.S. Cl. .................................................. 119/2
[51] Int. Cl.² ........................................ A01K 61/00
[58] Field of Search ......................................... 119/2

[56] References Cited
UNITED STATES PATENTS

| | | | |
|---|---|---|---|
| 3,473,509 | 10/1969 | Miyamura | 119/2 |
| 3,477,406 | 11/1969 | Fujinaga | 119/2 |
| 3,735,737 | 5/1973 | Budge | 119/4 |

OTHER PUBLICATIONS

Cook & Murphy, "Rearing Penaeid Shimp from Eggs to Postlarvae", 1966, pps. 283–288.

*Primary Examiner*—Hugh R. Chamblee
*Attorney, Agent, or Firm*—W. Dennis Drehkoff; Lawrence J. Hurst

[57] ABSTRACT

A method of spawning, collecting, shipping and hatching shrimp eggs by controlling the selection of spawned eggs to obtain only the most desirable, placing the desired eggs into a container for shipment and controlling the temperature of the eggs during shipment within a predetermined range to control the hatching thereof such that the shrimp do not progress beyond the beginning of the protozoeal stage of growth during the shipment thereof.

15 Claims, No Drawings

METHOD OF HANDLING SHRIMP EGGS

BACKGROUND OF THE INVENTION

The prior art is familiar with the desirability of commercially hatching and raising shrimp. In the past in order to obtain the necessary shrimp eggs for a shrimp growing operation, it was necessary for gravid female shrimp upon capture to be transferred to a hatchery operation. The shipment of such gravid female shrimp required rather close controls to be maintained over the oxygen supplied thereto and that they be maintained in a refrigerated or cooled condition. This cooling or refrigeration of the gravid female shrimp was necessary to inhibit or prevent the premature spawning of the female shrimp and hatching of eggs during the holding and shipment thereof. Thus, such shipment of gravid female shrimp is very costly requiring special shipping containers to maintain the proper controls and conditions for the shrimp. It is desirable to eliminate this expense if possible.

Additionally, by subjecting the gravid female shrimp to this handling and refrigerated condition over a period of timer, there was experienced uncertainty as to the quantity and quality of eggs hatched from the female shrimp. In fact there have been many instances where the gravid female shrimp would not spawn after such handling. Thus, the prior methods of handling the gravid female shrimp to obtain the necessary eggs could result in the operator proceeding with the time consuming and expensive handling of the female shrimp from the catch to the hatching operation and thereafter an unsatisfactory hatch or in fact no hatch at all could be obtained. Thus, a substantial risk factor exists concerning the handling of the female shrimp to obtain viable shrimp eggs. If this risk could be eliminated or lessened, such that a better probability of obtaining a good spawning and hatching of shrimp eggs is possible, it would provide a substantial economic advantage to the operator.

It is believed that the poor quantity and quality of eggs hatched is attributable to these changes in environment or conditions over extended periods of time to which the gravid female shrimp are subjected. Further, there is always an uncertainty concerning the viability of any eggs hatched by the female shrimp. Thus, it would be desirable to improve the quantity and quality of eggs being processed in a hatchery operation. Therefore, it would be desirable to eliminate the uncertainty of the spawning of female shrimp, to reduce the handling of the female shrimp and to control the processing of shrimp eggs so that only the most desirable or viable eggs are processed in the hatchery.

It is therefore one of the principle objects of applicant's invention to eliminate this high risk method of handling the gravid female shrimp and particularly to eliminate the shipment of the gravid female shrimp to a hatchery operation. Also, it is one of the objects of the present invention to control or manage the quality of the eggs, such that only viable eggs are carried forth in the process. Further, applicant's method of spawning, collecting, shipping and hatching shrimp eggs eliminates much of the uncertainty of the hatching operation heretofore previously experienced.

Additionally, applicant' method of handling the female shrimp and eggs enables greater control to be exercised over the hatchery operation, such that shrimp will be hatched in accordance with prescribed schedules rather than occuring within about 12 to 15 hours from spawning as normally occurs.

SUMMARY OF THE INVENTION

Briefly, the present invention comprises the method of spawning, collecting, shipping and hatching shrimp eggs wherein gravid female shrimp are placed into individual spawning tanks, allowed to remain in the tanks for a predetermined period of time sufficient for the eggs to be spawned, an aliquot sample of the eggs are checked to determine the viability thereof, the viable eggs are then placed into a sealed container for shipment with the temperature of the eggs being controlled during the shipment within a predetermined range to prevent the shrimp eggs from hatching and progressing beyond the beginning of the protozoeal stage of growth and preferably to prevent the hatching thereof, and thereafter the shrimp eggs are placed into a hatching tank with the temperature of the eggs being acclimated to a desirable hatching temperature and the shrimp eggs are hatched.

DESCRIPTION OF THE PREFERRED EMBODIMENTS

Gravid female shrimp are obtained or captured such as on shrimp boats and separated from the other shrimp as is well known in the art. The captured gravid female shrimp are then placed in the spawning chambers or holding tanks for the subsequent spawning operation. If desired, the spawning may be accomplished right on the shrimp boats, but preferably the captured female shrimp will be placed into refrigerated or cooled water maintained at a temperature generally in the range of 14°– 22° C. If the female shrimp are held in this condition, it is for a relatively short period of time, such that the change in environment does not adversely effect the female shrimp or adversely effect the spawning thereof. As is well known, the preferable temperature for the spawning of the female shrimp is 27°–29° C., and the female shrimp may be immediately placed in water at that temperature or acclimated thereto after the refrigerated holding. The individual spawning chambers or holding tanks into which the gravid female shrimp are placed is sufficiently large to accommodate the female shrimp with room to move and with sufficient oxygen supply for the female shrimp to spawn. This is particularly important in being able to properly control or monitor the eggs spawned by each of the individual female shrimp and also for maintaining tje eggs segregated prior to checking the eggs to determine the viability thereof. The female shrimp are maintained in the spawning tank for a sufficient period of time for the eggs to be spawned. As is well know in the art, it may be necessary to shock the female shrimp in order for spawning to occur. Preferably, the container will be shaped to enable the eggs to collect near the bottom thereof for easy removal. By maintaining the eggs of a particular female shrimp separate from the eggs of other female shrimp, it is possible to better control the quality of the eggs for further processing.

Following the spawning of the eggs, the gravid female shrimp is then removed from the spawning chamber or tank and the eggs collected therefrom. An aliquot sample of the eggs is then selected from each of the individual containers and subjected to microscopic determination for selecting the most desirable or viable eggs of those spawned. Such a selection of the desired or viable eggs is well within those skilled in the art and permits the undesirable eggs to be discarded such that the hatchery operation will not be processing undesirable eggs, which is a disadvantage of many prior art techniques of processing eggs. Following the selection of the desired or viable eggs, the eggs are then desirably subjected to a washing operation with pasteurized or sterilized sea water. This washing operation may be carried out for a number of occurrences with the more washing steps being utilized the more optimum condition for minimizing contamination of the spawned eggs. This washing operation not only minimizes disease and contamination of the eggs, but also serves to eliminate the mucous and debris normally occurring in the spawning and serves to prevent the eggs from sticking together during the subsequent shipment and treatment thereof. If desired, the eggs may be separated from the debris by means of filtering the hatch water or the filtering and washing may be used in combination depending on the operator's preference. A washing step wherein the eggs are washed three to six times with pasteurized or sterilized sea water has proven quite satisfactory for carrying out this step of the operation.

Following the accumulation of the eggs and desirably the washing thereof, the eggs are then concentrated in a shipping container up to about 5,000 eggs per milliliter of pasteurized or sterilized sea water and preferably in the range of 800 – 2,000 eggs per milliliter of water in the container. The salinity of the pasteurized or sterilized seawater included in the container is controlled in the range of 23 – 36 parts per thousand and preferably 28 – 31 parts per thousand, and the container is then sealed. This sealed container may either be of the ridged type, such as a glass or pastic vial or jar, or may be a plastic bag, such as polyethylene. Desirably, the container will have a large surface or bottom area for accommodating the eggs to prevent the eggs from being stacked on one another or from sticking together. The temperature of the water in which the eggs are placed for shipment will be controlled depending upon the length of time to be required for the shipment of the eggs and the length of time it is desired to hold the shrimp eggs prior to the hatching thereof. Generally, the lower the temperature of the water in which the eggs are placed, the longer the period of time before hatching will occur. Preferably, the temperature at which the eggs will be maintained during shipment will be within the range of about 14° – 30° C.

By controlling the temperature of the water during the shipment of the eggs, it is possible to regulate the hatching of the shrimp eggs such that the shrimp will not progress beyond the beginning of the protozoeal stageof development and preferably the shrimp eggs may be received by the operator at the hatchery in an unhatched condition. The desirability of obtaining the shrimp eggs either unhatched or hatched but prior to the beginning of the protozoeal stage will depend on the operator's preferance. However, by maintaining the temperature of the water in the lower portion of the previously discussed temperature range, it is possible to retain the eggs for an extended period of time prior to the hatching thereof. Additionally, it is desirable to maintain an oxygen level within the container at a sufficient level to prevent any deleterious effect from occurring to the shrimp eggs. This is readily achieved by sealing the container with a supersaturated sea level atmosphere in the container.

Thus, by controlling the temperature of the water in which the eggs are placed, it is possible to regulate or control the time at which the eggs will hatch. If it is desired that the eggs arrive at the hatchery operation in an unhatched condition, the water temperature would be maintained at a temperature or below a temperature which is sufficient to prevent the hatching thereof and desirably below a temperature of approximately 26°C. The preferred temperature of the water being in the range of about 21 –25° C.

Following the shipment of the eggs in the sealed container and under conditions sufficient to prevent the hatching thereof during shipment, the eggs are then placed in hatching tanks. The eggs are then allowed to become acclimated to a temperature which is desirable for hatching, which is normally considered to be approximately 26° – 30° C. and preferably 27° – 29° C. Additionally, since only viable eggs have been selected and shipped, it is possible for the hatchery operator to control the number of eggs introduced into each of the hatching tanks, such that more desirable stocking densities may be obtained. The eggs would then be allowed to hatch and the growth of the shrimp controlled as is well known in the art.

As an alternative, it may be desirable for the shrimp eggs to be hatched during the shipment thereof to the hatchery operation. By controlling the temperature of the water in which the eggs are placed during the shipment thereof, it is possible to regulate or control the time at which the eggs will begin hatching. By allowing the water to attain the temperature in the range of about 26° – 30° C. during the shipment, it is possible to achieve the hatching of the shrimp eggs within a period of about 12 – 15 hours. Thus, be regulating or controlling the water temperature such that the water attains this temperature during the shipment of the eggs, it is possible to attain the degree of hatching desired. However, it should be understood that the hatching and growth of the young shrimp should be controlled such that the shrimp do not progress beyond the beginning of the protozoeal stage of growth during the shipment and holding of the eggs in the sealed containers. This is important since shrimp which have progressed into the protozoeal stage of growth require additional forms of feed to support life. As is obvious, the operator of the hatchery operation may either control the shipment of the eggs such that when he receives them, the shrimp have hatched and are beginning their growth development or he may receive the eggs in an unhatched condition and allow the eggs to be hatched and the growth development to begin prior to placing the shrimp into the hatchery operation for their further growth development.

From the foregoing, it is now apparent that a novel method of spawning, shipping and hatching shrimp eggs has been disclosed and that other modifications and variations may be made in the method set forth herein by way of example without departing the spirit of the invention as defined by the claims as follows.

We claim: We claim:

1. A method of spawning, and shipping shrimp eggs comprising the steps of: placing gravid female shrimp into spawning tanks; retaining the gravid female shrimp in the tank for a period of time sufficient for the eggs to be spawned; collecting the spawned eggs from the tanks; selecting an aliquot sample of the eggs to determine the viability thereof; placing the viable eggs into a sealed container at a concentration up to about 5,000 eggs per milliliter of sea water in the container; and controlling the temperature of the sea water during shipment within a predetermined range sufficient to prevent the eggs from hatching and progressing beyond the beginning of the protozoeal stage of growth during the shipment thereof and thereafter acclimating the shrimp in sea water under desired conditions for the subsequent growth thereof.

2. The method according to claim 1 wherein the temperature of the sea water during the shipment of the eggs is within the range of 21° – 25°C.

3. The method according to claim 2 wherein the gravid female shrimp is held in sea water at a temperature of about 14° –22° C. prior to the spawning thereof, and the gravid female shrimp is placed into individual spawning tanks for the spawning of the eggs.

4. The method according to claim 1 wherein the concentration of eggs in the container is in the range of about 800 – 2,000 eggs per milliliter of sea water and the temperature of the sea water during the shipment of the eggs is controlled within the range of about 21° – 25° C.

5. The method according to claim 4 including the step of washing the eggs following the collection thereof and prior to the placement in the sealed container.

6. A method of spawning, shipping and hatching shrimp comprising the steps of:
   placing gravid female shrimp into individual spawning tanks;
   allowing the gravid female shrimp to remaining in the tank for a period of time sufficient for the eggs to be spawned;
   collecting the spawned eggs;
   selecting an aliquot sample of the spawned eggs to determine the viability of the eggs;
   placing the viable eggs into a sealed container for shipment at a concentration up to about 5,000 eggs per milliliter of sea water in the container;
   controlling the temperature of the sea water during the shipment of the eggs within a predetermined range sufficient to prevent hatching of the eggs within about 12 – 15 hours from spawning as normally occurs and during the shipment thereof;
   acclimating the sea water containing the eggs to a desirable temperature for hatching the eggs; and
   hatching the shrimp.

7. The method according to claim 6 including the step of washing the eggs following the collection thereof and prior to the placement of the eggs in the sealed container.

8. The method according to claim 6 wherein the concentration of eggs in the container is in the range of about 800 – 2,000 eggs per milliliter of sea water.

9. The method according to claim 8 wherein the temperature of the sea water during the shipment of the eggs is maintained within the range of 21° – 25° C.

10. The method according to claim 8 wherein the salinity of the sea water in the container is maintained in the range of 23 – 36 parts per thousand.

11. The sea method according to claim 7 wherein the temperature of the water during the shipment of the eggs is maintained within the range of 21° – 25° C.

12. The method according to claim 11 wherein the gravid female shrimp is held in sea water at a temperature of about 14° – 22° C. in the individual spawning tanks prior to the spawning thereof.

13. A method of handling shrimp eggs wherein spawned eggs are collected from gravid female shrimp and the viable eggs are separated therefrom for hatching comprising the steps of: placing the viable eggs in a container at a concentration up to about 5,000 eggs per milliliter of sea water in the container, controlling the temperature of the sea water within the range of 21° – 25° C. and maintaining the shrimp eggs therein for a predetermined period of time and thereafter removing the shrimp eggs from the container and acclimating the shrimp eggs in sea water at a temperature desirable for hatching the shrimp from the shrimp eggs.

14. The method according to claim 13 wherein the acclimating of the shrimp eggs is achieved by placing the shrimp eggs in sea water at a temperature of approximately 26 - 30° C. and permitting the hatching of the shrimp from the shrimp eggs.

15. A method of handling shrimp eggs comprising the steps of: placing the shrimp eggs in a sealed container at a concentration up to about 5,000 eggs per milliliter of sea water in the container, controlling the temperature of the sea water within the container for a predetermined period of time to prevent the eggs from hatching and progressing beyond the beginning of the protozoea stage of growth of the shrimp and thereafter removing the shrimp from the container and acclimating the shrimp in sea water under desired conditions for the subsequent growth thereof.

* * * * *

UNITED STATES PATENT AND TRADEMARK OFFICE
CERTIFICATE OF CORRECTION

PATENT NO. : 3,906,900
DATED : September 23, 1975
INVENTOR(S) : Y. Hirono & D. E. Sweat It is certified that error appears in the above-identified patent and that said Letters Patent are hereby corrected as shown below:

Column 1, line 23 - "timer" should read "time"

Column 2, line 49 - "tje" should read "the"

Column 4, line 34 - "be" should read "by"

Column 4, line 60 - the second "We claim" should be omitted

Column 5, line 32 - "remaining" should read "remain"

Column 6, line 13 - omit the word "sea"

Column 6, line 14 - insert "sea" prior to "water"

Signed and Sealed this twentieth Day of April 1976

[SEAL]

Attest:

RUTH C. MASON
Attesting Officer

C. MARSHALL DANN
Commissioner of Patents and Trademarks